June 19, 1923.
E. P. MILLER
1,459,597
HUB AND WHEEL HOLDING DEVICE
Filed May 10, 1922
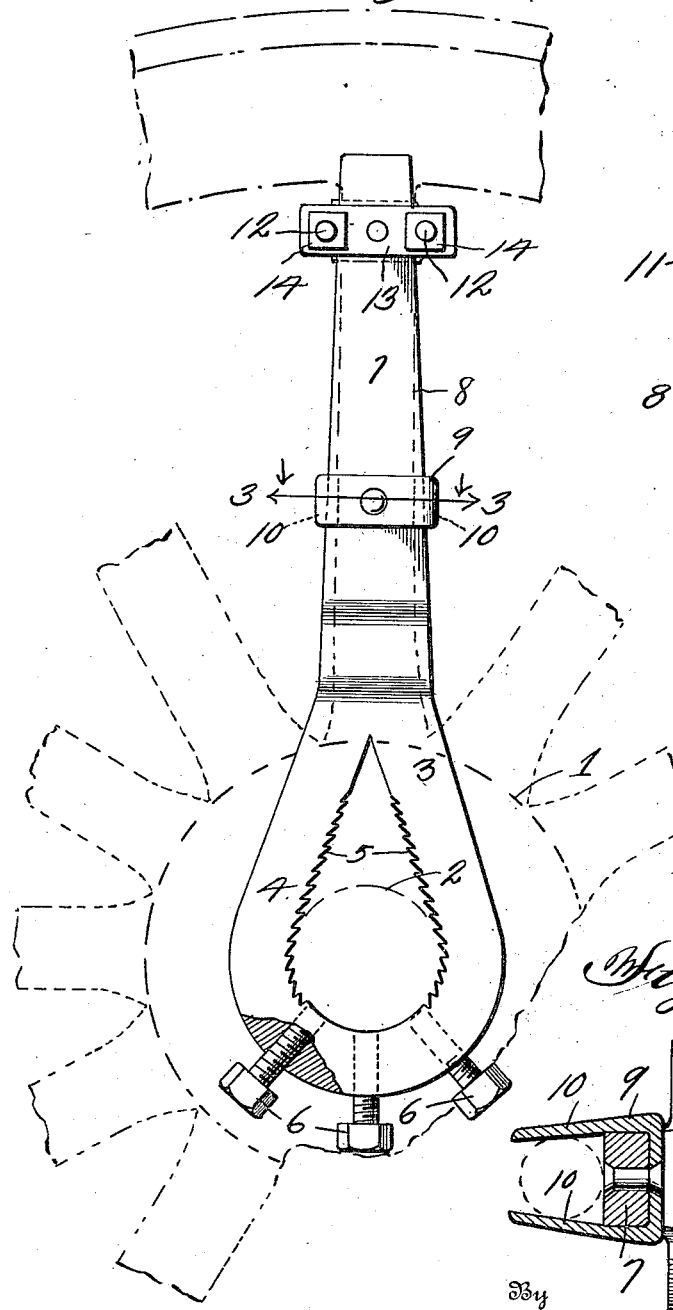
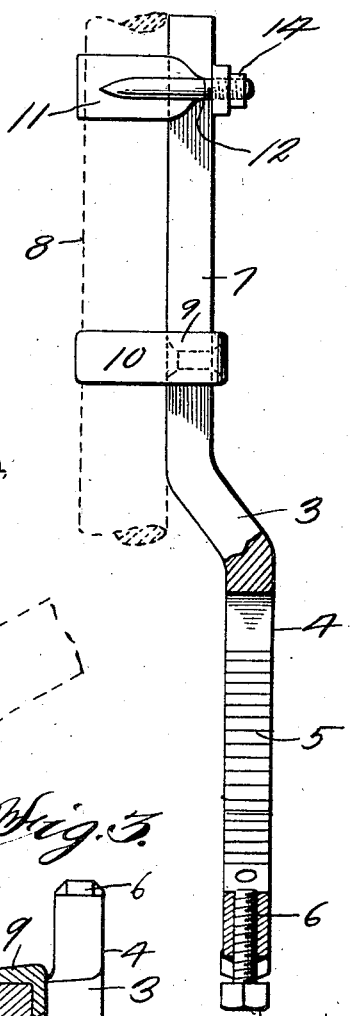
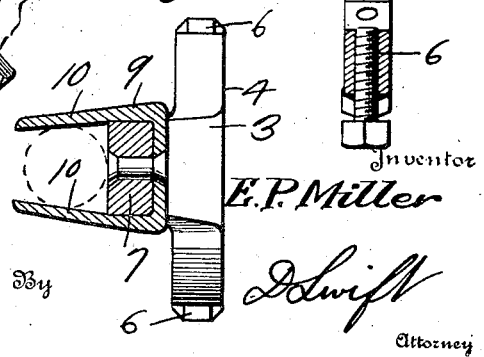
Inventor
E. P. Miller
By D. Swift
Attorney

Patented June 19, 1923.

1,459,597

UNITED STATES PATENT OFFICE.

EDWARD P. MILLER, OF ATWATER, MINNESOTA.

HUB AND WHEEL HOLDING DEVICE.

Application filed May 10, 1922. Serial No. 559,778.

*To all whom it may concern:*

Be it known that I, EDWARD P. MILLER, a citizen of the United States, residing at Atwater, in the county of Kandiyohi, State of Minnesota, have invented a new and useful Hub and Wheel Holding Device; and I do hereby declare the following to be a full, clear, and exact description of the invention, such as will enable others skilled in the art to which it appertains to make and use the same.

The invention relates to hub and wheel holding devices and has for its object to provide a device of this character particularly adapted for holding a broken hub of a drive wheel of an automobile in such a manner that when said hub is broken so that it will not drive the drive wheel, the hub and wheel holding device will hold the hub and wheel together in such a manner that the wheel will be driven, thereby allowing the automobile to be driven under its own power to a garage.

A further object is to provide a hub and wheel holding device comprising a looped member adapted to receive the wheel hub, set screws for holding said hub against rotation in the looped member, and spoke attaching members whereby the hub and wheel will be rigidly held in such a manner that they will rotate together.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a view in side elevation of a portion of an automobile drive wheel, showing the hub and wheel holding device applied thereto.

Figure 2 is a side elevation of the hub and wheel holding device parts being broken away to better show the structure.

Figure 3 is a horizontal sectional view taken on the line 3—3 of Figure 1.

Referring to the drawing, the numeral 1 designates a conventional form of automobile wheel which wheel is a rear drive wheel and 2 the hub thereof. It has been found that where the hub 2 in many forms of vehicle is broken that the broken hub will spin in the wheel 1 without rotating the wheel. Under these conditions it is necessary to secure another vehicle to tow the automobile to a garage. To overcome this difficulty and to secure the wheel 1 and the broken hub 2 together in such a manner that they will rotate together a hub and wheel holding device 3 is provided. The hub and wheel holding device 3 comprises a hub receiving loop 4 having teeth 5 therein for engaging the broken hub 2 and holding said hub against rotation in the loop 4 when the spaced radially disposed set bolts 6 are tightened. It will be seen that when the bolts 6 are tightened that the broken hub 2 will be securely clamped within the loop 4 in such a manner that it cannot rotate without rotating the loop. The loop 4 terminates in a radially extending arm 7 adapted to register with one of the spokes 8 of the wheel and is provided with a U-shaped member 9, the arms 10 of which engage opposite sides of the spoke 8 and prevent rotation of the wheel 1 except in unison with the hub and wheel holding device 3. The hub and wheel holding device 3 at its upper end is provided with a removable U-shaped member 11 which extends around the rear side of the spoke 8 and has its threaded ends 12 extending through apertures of a plate 13 carried by the outer side of the arm 7, said threaded ends being provided with nuts 14 whereby the arm 7 may be rigidly clamped to the spoke 8 at a point spaced from the U-shaped member 9, thereby insuring the simultaneous rotation of the wheel 1 and the broken hub 2 when said broken hub is driven by the driving axle of the automobile. By providing spaced spoke engaging members for the arm 7 it is obvious that a twisting action on the spoke 8 at a single point is eliminated.

From the above it will be seen that a hub and wheel holding device is provided which is simple in construction, the parts reduced to a minimum, and one which may be easily and quickly applied to a hub and wheel.

The invention having been set forth what is claimed as new and useful is:—

The combination with a broken hub, said hub being driven by a driven axle, a wheel, of means whereby said wheel will be caused to rotate with the broken hub, said means comprising a radially extending hub holding device detachably connected to the hub, said hub holding device comprising a head having a hub receiving opening therein, a spoke engaging arm carried by the head, the inner end of the hub receiving opening being arcuate shaped, the side walls of the hub receiving opening converging outwardly towards the arm and merging together adjacent the arm, teeth carried by the converging side walls of the hub receiving opening and radially disposed hub engaging screws extending through the arcuate end of the head and adapted to engage the hub and force the same into engagement with the teeth.

In testimony whereof I have signed my name to this specification in the presence of two subscribing witnesses.

EDWARD P. MILLER.

Witnesses:
PETER C. SCOBY,
CARL APELGNEW.